(12) United States Patent
Bhogal et al.

(10) Patent No.: US 10,091,454 B2
(45) Date of Patent: Oct. 2, 2018

(54) RECORDING EVENTS IN A VIRTUAL WORLD

(71) Applicant: International Business Machines Corporation, Armonk, NY (US)

(72) Inventors: Kulvir S. Bhogal, Pflugerville, TX (US); Lisa Seacat DeLuca, San Francisco, CA (US); Timothy J. Eby, Austin, TX (US); Samuel I. Ward, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 341 days.

(21) Appl. No.: 14/858,115

(22) Filed: Sep. 18, 2015

(65) Prior Publication Data

US 2016/0006977 A1    Jan. 7, 2016

Related U.S. Application Data

(63) Continuation of application No. 13/620,810, filed on Sep. 15, 2012, now Pat. No. 9,171,286, which is a
(Continued)

(51) Int. Cl.
| | |
|---|---|
| *G06F 17/00* | (2006.01) |
| *G06Q 30/02* | (2012.01) |
| *G06F 17/30* | (2006.01) |
| *H04N 5/91* | (2006.01) |
| *A63F 13/30* | (2014.01) |
| *G06Q 10/10* | (2012.01) |
| *G06N 3/00* | (2006.01) |

(52) U.S. Cl.
CPC ............ *H04N 5/91* (2013.01); *A63F 13/12* (2013.01); *G06Q 10/10* (2013.01); *A63F 2300/5553* (2013.01); *G06N 3/006* (2013.01)

(58) Field of Classification Search
CPC ........ A63F 13/12; A63F 13/493; G06N 3/006
See application file for complete search history.

(56) References Cited

U.S. PATENT DOCUMENTS

| | | |
|---|---|---|
| 5,758,110 A | 5/1998 | Boss et al. |
| 6,119,147 A | 9/2000 | Toomey et al. |

(Continued)

FOREIGN PATENT DOCUMENTS

WO    03058518 A3    5/2004

OTHER PUBLICATIONS

Belady, L.A.. "A study of replacement algorithms for a virtual-storage computer", 1966, IBM Systems Journal, vol. 5, No. 2, pp. 78-101.

(Continued)

*Primary Examiner* — Jordany Nunez
(74) *Attorney, Agent, or Firm* — Patterson + Sheridan, LLP

(57) ABSTRACT

Systems, methods and articles of manufacture are disclosed for recording events occurring in a virtual world. In one embodiment, properties of events previously recorded and/or attended by a user may be identified. Recording criteria for the user may be derived from the identified properties. Upon identifying an event satisfying the recording criteria, the event may be recorded. The recorded event may be played back at the convenience of the user.

20 Claims, 4 Drawing Sheets

Related U.S. Application Data continuation of application No. 12/622,205, filed on Nov. 19, 2009, now Pat. No. 8,365,075.

(56) References Cited

U.S. PATENT DOCUMENTS

| | | |
|---|---|---|
| 6,804,638 B2 | 10/2004 | Fiedler |
| 7,062,497 B2 | 6/2006 | Hamburg et al. |
| 8,531,462 B1 | 9/2013 | Tillman et al. |
| 2003/0204848 A1 | 10/2003 | Cheng et al. |
| 2004/0261026 A1 | 12/2004 | Corson |
| 2006/0148571 A1 | 7/2006 | Hossack et al. |
| 2006/0246973 A1 | 11/2006 | Thomas et al. |
| 2007/0156908 A1 | 7/2007 | Szomolanyi et al. |
| 2008/0207327 A1 | 8/2008 | Van Luchene et al. |
| 2008/0215971 A1 | 9/2008 | Gillo et al. |
| 2009/0063983 A1 | 3/2009 | Amidon et al. |
| 2009/0089684 A1* | 4/2009 | Boss .................. A63F 13/10 715/757 |
| 2009/0100353 A1 | 4/2009 | Cradick et al. |
| 2009/0112906 A1 | 4/2009 | Shuster |
| 2009/0150357 A1 | 6/2009 | Shinji Iizuka |
| 2009/0169179 A1 | 7/2009 | Johnson |
| 2009/0177969 A1 | 7/2009 | Jones et al. |
| 2009/0189982 A1 | 7/2009 | Tawiah |
| 2009/0204898 A1 | 8/2009 | Jones et al. |
| 2009/0276492 A1 | 11/2009 | Babbitt et al. |
| 2009/0325138 A1 | 12/2009 | Shuster |
| 2010/0082548 A1* | 4/2010 | Crockett .......... G06F 17/30011 707/662 |
| 2010/0105484 A1 | 4/2010 | Horneff et al. |
| 2010/0124360 A1 | 5/2010 | Hou et al. |
| 2011/0119581 A1 | 5/2011 | Bhogal et al. |
| 2012/0258797 A1 | 10/2012 | Cullen et al. |
| 2013/0014011 A1 | 1/2013 | Bhogal et al. |
| 2013/0091432 A1 | 4/2013 | Shet et al. |
| 2014/0028789 A1 | 1/2014 | Bentley et al. |
| 2014/0133825 A1 | 5/2014 | Kozloski et al. |
| 2015/0052092 A1* | 2/2015 | Tang .................... G06N 99/002 706/16 |

OTHER PUBLICATIONS

Greenhalgh, Chris et al., "Patterns of Network and User Activity in an Inhabited Television Event," Presence Teleoperators & Virtual Environments (Impact Factor: 0.91), Feb. 2001, 10, pp. 34-41.

* cited by examiner

RECORDING EVENTS IN A VIRTUAL WORLD

This application is a continuation of co-pending U.S. patent application Ser. No. 13/620,810, filed Sep. 15, 2012, which is a continuation of U.S. patent application Ser. No. 12/622,205, filed Nov. 19, 2009, now U.S. Pat. No. 8,365,075. The aforementioned related patent applications are herein incorporated by reference in their entirety.

BACKGROUND

Embodiments of the invention relate to immersive visual environments. More specifically, embodiments of the invention relate to techniques for recording events occurring within a virtual world.

DESCRIPTION OF THE RELATED ART

A virtual world is a simulated environment which users may inhabit and interact with virtual objects and locations of the virtual world. Users may also interact with one another via avatars. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available, and where events continue to occur, regardless of the presence of a given avatar. Thus, unlike more conventional online games or multi-user environments, the virtual world continues to exist, and plots and events continue to unfold as users enter (and exit) the virtual world. Virtual environments are presented as images on a display screen. Further, some virtual environments allow users to record events that occur within the virtual environment.

SUMMARY

One embodiment of the invention includes a computer-implemented method. The method may generally include configuring one or more computer processors to perform an operation. The operation may generally include identifying properties of a plurality of events having occurred in a virtual world; deriving, from the identified properties, at least one recording criterion for a user; upon identifying an event occurring in the virtual world that satisfies the determined at least one recording criterion, generating a recording of the event for the user; and storing the recording on a computer readable storage medium, from which the recording is accessible.

Another embodiment of the invention includes a computer-readable storage medium containing a program, which, when executed on a processor, performs an operation. The operation may generally include identifying properties of a plurality of events having occurred in a virtual world; deriving, from the identified properties, at least one recording criterion for a user; upon identifying an event occurring in the virtual world that satisfies the determined at least one recording criterion, generating a recording of the event for the user; and storing the recording on a computer readable storage medium, from which the recording is accessible.

Still another embodiment includes a system having one or more computer processors and a memory containing a program, which when executed by the one or more computer processors is configured to perform an operation. The operation may generally include identifying properties of a plurality of events having occurred in a virtual world; deriving, from the identified properties, at least one recording criterion for a user; upon identifying an event occurring in the virtual world that satisfies the determined at least one recording criterion, generating a recording of the event for the user; and storing the recording on a computer readable storage medium, from which the recording is accessible.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
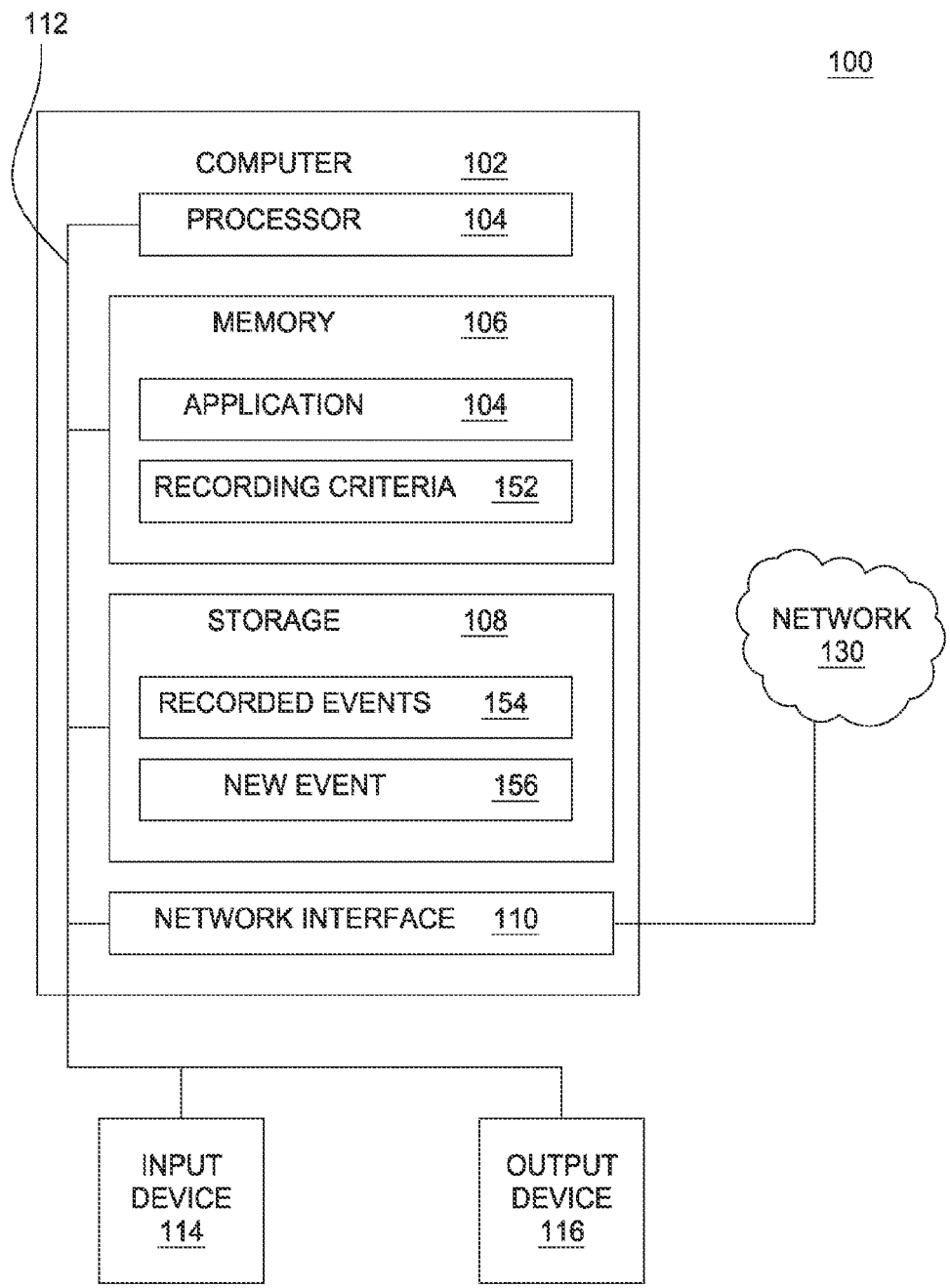
FIG. 1 is a block diagram illustrating a system for recording an event occurring in a virtual world, according to one embodiment of the invention.

Embodiments of the invention generally provide techniques for recording events occurring in a virtual world. As is known, a virtual world provides a simulated environment where users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach and interact with another avatar by communicating, performing commercial transactions, engaging in recreational activities, and the like. Thus, multiple users, although in different physical locations, may be present in the same virtual location and interact with one another using their respective avatars.

In a virtual world, like in the real world, it is often desirable to capture moments and memories into a video recording. Just like in the real world, many events serve as a potential "video opportunity" to a user. However, a user may sometimes forget to specify for an event of interest to be recorded. Further, it may be inconvenient for a user to sift through a list of events to identify an event of interest.

Accordingly, one embodiment of the invention provides a software application (or simply, application) configured to identify when to record an event. The application may record an event based on previously attended and/or recorded events of the user. For instance, if a user frequently records (or attends) virtual sporting events, the application may record a new virtual sporting event for the user (when the new virtual sporting event occurs). As another example, if a user frequently attends (or records) events hosted at a specific neighborhood in the virtual world (or in which specific users are consistently present), the application may record a new event being hosted in the neighborhood (when the new event occurs). The user may then play the recorded event at the convenience of the user, without having to specify that the event be recorded.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for recording an event occurring in a virtual world, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 and recording criteria 152. The storage 108 of the computer 102 includes recorded events 154 and a new event 156. In one embodiment, application 150 may be a virtual world client. A virtual world client is a software program that allows a user to connect, via the network 130, to a virtual world server application running on another computer. Once connected, the virtual world client allows the user to perform various actions in order to interact with the virtual world and other users present therein. Such actions may include exploring virtual locations, interacting with other avatars, and interacting with virtual objects.

Further, the virtual world client may be configured to generate and display a visual representation of the user within the immersive environment, generally referred to as an avatar. The avatar of the user is generally visible to other users in the virtual world, and the user views avatars representing other users. The virtual world client may also be configured to generate and display the immersive environment to the user and to transmit the user's desired actions to the virtual world server application. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

While embodiments are described herein with reference to an application 150 that is a virtual world client application, other embodiments are broadly contemplated without departing from the scope of the invention. For example, in an alternative embodiment, the application 150 may itself be a virtual world server application. In such a case, events may be recorded on the server side rather than on the client side. That is, the application 150 may record events for users of client computers that are connected to the computer 102 via the network 130. The application 150 may then transmit the recorded events (via the network 130) to the client computers for playback on the client computers.

Figure 2:
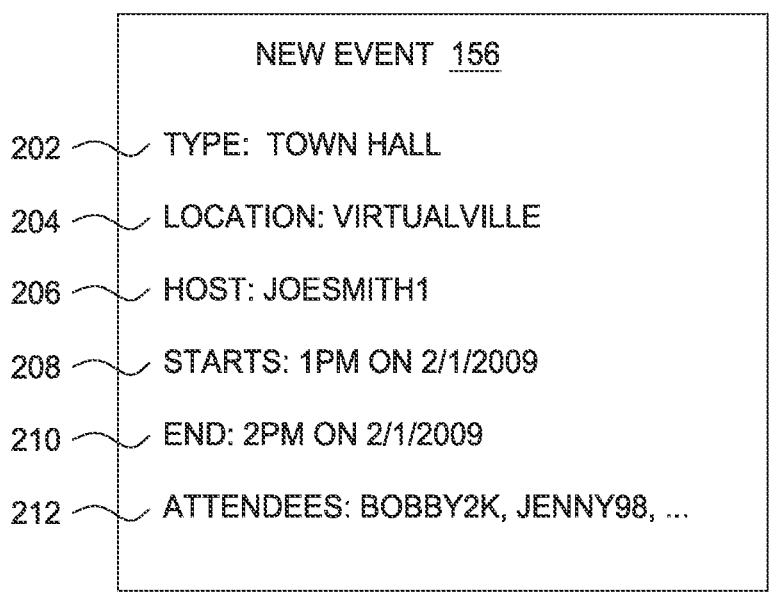
FIG. 2 illustrates properties of the event occurring in the virtual world, according to one embodiment.

Suppose a town hall event, hosted by a user "Joe Smith," is to be held in Virtualville (a city in the virtual world) on Feb. 1, 2009, to begin at 1 pm and to end at 2 pm. FIG. 2 illustrates properties 200 of the event occurring in the virtual world, according to one embodiment. As shown, the properties 200 of the event include a type 202 of the event, a location 204 of the event, a host 206 of the event, a starting time 208 for the event, an ending time 210 for the event, and a list 212 of attendees to the event. In this specific example, the event is a town hall event to be held in Virtualville. Further, the event is to be hosted by an avatar "joesmith1" and is to start at 1 pm and end at 2 pm. Further, at least avatars "bobby2k" and "jenny98" are scheduled to attend the event. Of course, those skilled in the art will recognize that embodiments of the invention may be adapted to support other properties of events (e.g., a scheduled duration of the event, a count of attendees to the event, etc.).

Figure 3:
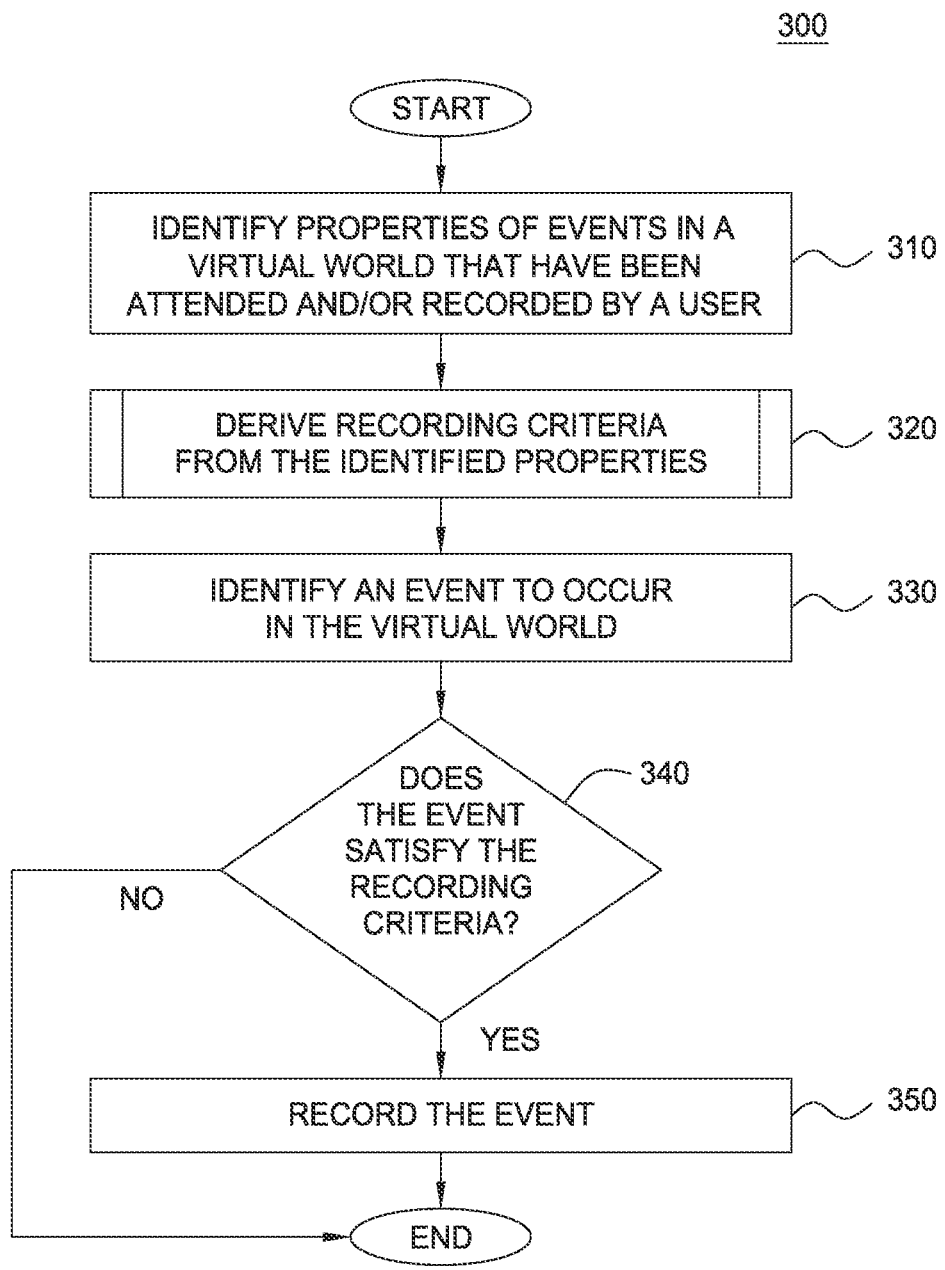
FIG. 3 is a flowchart depicting a method for recording the event occurring in the virtual world, according to one embodiment of the invention.

In one embodiment, the application 150 determines whether to record the new event 156 based on events 154 previously recorded for (and/or attended by) the user. FIG. 3 illustrates a method 300 for selectively recording events occurring in the virtual world, according to one embodiment of the invention. As shown, the method 300 begins at step 310, where the application 150 identifies properties of events 154 previously recorded for (and/or attended by) the user. For example, the application 150 may identify locations, hosts, and attendees to the recorded events 154. In one embodiment, properties of the record (or attended) events are used to identify patterns or characteristics of events that are of interest to a particular user. Once identified, events scheduled to occur (or about to occur) that match the identified patters or characteristics may be selected by the application 150 to be recorded, without the need for the user to specify that such an event be recorded. For example, the system might identify that a given user frequently attends a virtual sporting (or video-game) competition between other users. Or that the user frequently joins such matches as an observer (i.e., a person who may observe a multi-player game without participating). At step 320, the application 150 may derive recording criteria from the identified properties. Step 320 is further described below in conjunction with FIG. 4.

At step 330, the application 150 identifies a subsequent event scheduled to occur in the virtual world (or an event that is or is about to occur). For example, the application 150 may identify that a town hall event, hosted by Joe Smith, is to occur. As noted, the application 150 may identify the event from an explicit scheduling notice. However, other approaches may be used. For example, the application 150 may identify an event by a group of characteristics, e.g., a minimum number of virtual world avatars present at a virtual location engaging in a specified activity (e.g., a virtual sporting competition between two avatars being observed by a minimum number of spectators). At step 340, the application 150 may determine whether the event 156 satisfies the recording criteria 152. If so, the application 150 records the event (step 350). For example, the application 150 may direct another application to create a digital recording of the event (e.g., an MPEG-2 AVI or other video encoding scheme). Alternatively, the application 150 may capture data (from the virtual world) sufficient to reconstruct the event 156 for playback. The user may later play the recorded event 156 at the convenience of the user. The user may also share the event with another user of the virtual world.

While event recordings have been described as video recordings, those skilled in the art will recognize that embodiments of the invention may be adapted to support any type of recording including video, still images (such as a photo album and/or slideshow), and audio. For example, the application 150 may capture still images and audio (i.e., rather than video) for an event.

In one embodiment, the application 150 records the event upon determining that sufficient storage is available for recording the event. The application 150 may also take into account a desired size of storage for recording events, specified by a user. For example, the application 150 may refrain from recording an event if doing so would exceed either the available storage space or the user-specified storage space. In one embodiment, if recording a video of the event would exceed the either the available storage space, the application 150 may record an audio and/or still images of the event (i.e., assuming doing so would not exceed the available storage space). After the step 350 or if the event 156 does not satisfy the recording criteria 152, the method 300 terminates. Alternatively, the application 150 may delete the oldest recordings to increase the available storage capacity. Of course, these and other preferences may be set by the application, the virtual world provider, or as a matter of user preference.

While embodiments are herein described with reference to determining whether to record a new event based on previously recorded events for the user, other embodiments are broadly contemplated without departing from the scope of the invention. For example, in an alternative embodiment, the application may determine whether to record a new event based on events previously attended (but not necessarily recorded) by the user. For instance, a virtual world server application executing on a server computer (with which the application 150 communicates via the network 130) may store information about which events the user attends. The virtual world server application may determine to record a new event based on the stored information. The virtual world server application may then record the new event (or instruct the application 150 to record the new event).

Figure 4:
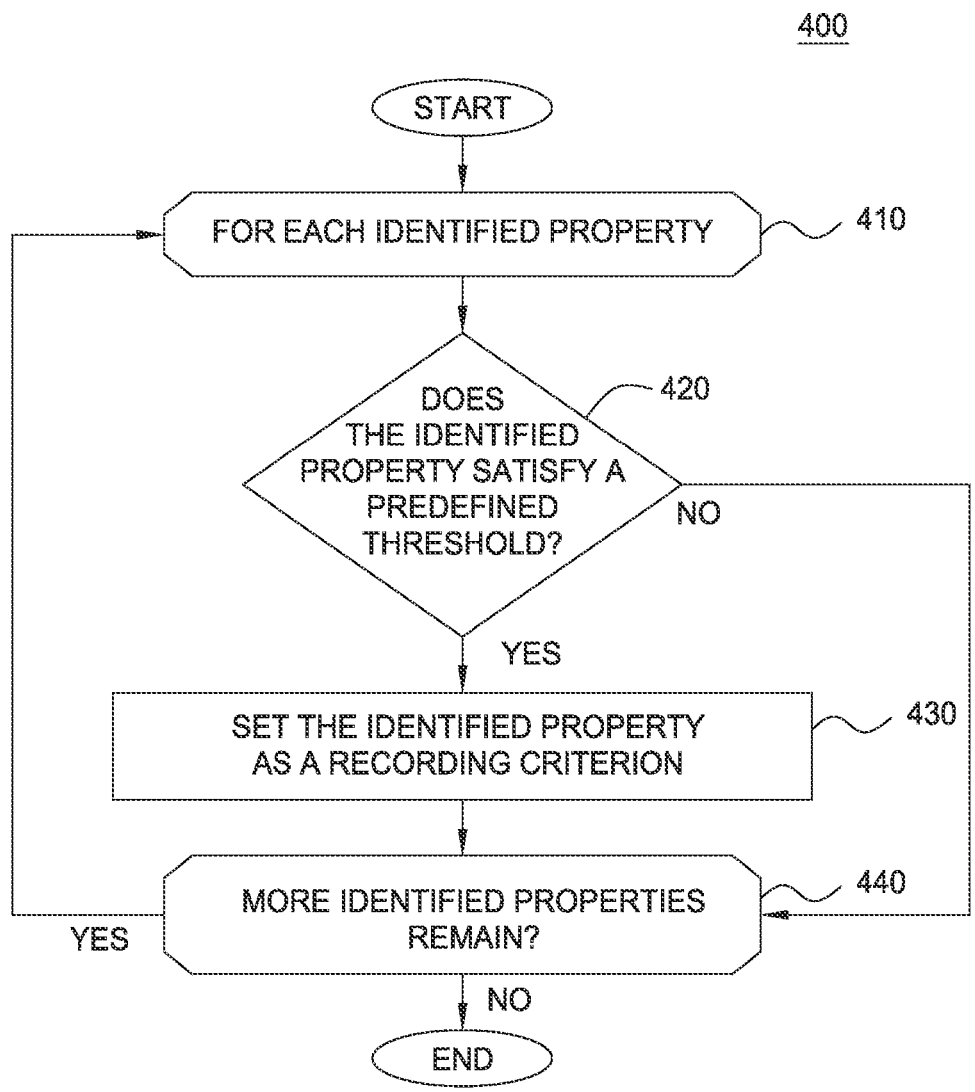
FIG. 4 is a flowchart depicting a method for deriving recording criteria from the properties of events previously recorded, according to one embodiment of the invention.

FIG. 4 is a flowchart 400 depicting a method 400 for deriving recording criteria from properties of an event recorded (or attended) by a user of the virtual world, according to one embodiment of the invention. Method 400 corresponds to step 320 of FIG. 3. As shown, method 400 begins at step 410, where a loop begins for the identified properties (i.e., properties of events that are identified to represent an event that is of interest to the user). The application 150 determines whether each identified property satisfies a predefined threshold (step 420). For example, the application 150 determines whether more than eighty percent of the recorded events 154 are "Town hall" type events held at a particular virtual world location. Of course, those skilled in the art will recognize that the identified property and the predefined threshold may be tailored to suit the needs of a particular case. For example, the predefined threshold may be expressed as a count, a percentage, in standard deviations, etc.

If the identified property satisfies the predefined threshold, the application 150 sets the identified property as a recording criterion 152 (step 430). For example, if more than eighty percent of the recorded events 154 are "Town hall" type events, the application 150 may set the identified property "event type=Town hall" as a recording criterion 152. The application 150 may also set other recording criteria 152 that represent an event that is of interest to the user. The application 150 may record any event that satisfies at least one of the recording criteria 152. Further, each recording criterion 152 may include multiple properties. For example, a recording criterion may be "event type=Town hall AND number of attendees>50." At step 440, the application 150 determines whether more identified properties remain to be evaluated. If so, the method 400 returns to the step 410 to evaluate another identified property. Otherwise, the method 400 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide an application configured to record events occurring in a virtual world. In one embodiment, the application may identify properties of events previously recorded and/or attended by a user. The application may derive, from the identified properties, recording criteria for the user. Upon identifying an event satisfying the recording criteria, the application may record the event. Consequently, the application may record the event without requiring the user to specify that the event be recorded. The user may later play the recorded event at the convenience of the user.

While the foregoing is directed to embodiments of the present invention, other and further embodiments of the invention may be devised without departing from the basic scope thereof, and the scope thereof is determined by the claims that follow.

What is claimed is:

1. A computer-implemented method to identify events to record for users interacting with one another via avatars in a virtual world, the computer-implemented method comprising:
   identifying, for each of a plurality of users including a first user and a second user, properties of a respective plurality of events having occurred in the virtual world and having been attended by the respective user via a respective avatar;
   programmatically deriving, based on the identified properties for each of the plurality of users and by operation of one or more computer processors, a respective recording criterion common across the respective plurality of events attended by the respective user, wherein the programmatically deriving includes deriving a first recording criterion specific to the first user and a second recording criterion specific to the second user, wherein the first and second recording criteria are distinct;
   upon a first event occurring and satisfying the derived first recording criterion, generating a first recording comprising captured video footage of at least part of the first event;
   upon a second event occurring subsequent to the first event and satisfying the derived second recording criterion, generating a second recording comprising captured event data of at least part of the second event, wherein the captured event data excludes video footage and comprises data sufficient to reconstruct at least part of the second event for playback; and
   outputting the captured video footage and the captured event data.

2. The computer-implemented method of claim 1, wherein deriving the first recording criterion specific to the first user comprises:
   identifying a property, associated with each of the plurality of events, that occurs with a frequency which exceeds a predefined threshold.

3. The computer-implemented method of claim 1, wherein the first and second recordings are generated automatically and without receiving any user request explicitly specifying to record any of the first and second events.

4. The computer-implemented method of claim 1, wherein the first recording criterion specific to the first user and the second recording criterion specific to the second user are derived automatically and without receiving any user-specified recording criterion.

5. The computer-implemented method of claim 1, wherein the events to record are identified based on recording criteria specific to the users and programmatically derived from occurred events in the virtual world.

6. A computer program product to identify events to record for users interacting with one another via avatars in a virtual world, the computer program product comprising:
   a non-transitory computer-readable medium having computer-readable program code embodied therewith, the computer-readable program code executable by one or more computer processors to:
   identify, for each of a plurality of users including a first user and a second user, properties of a respective plurality of events having occurred in the virtual world and having been attended by the respective user via a respective avatar;
   programmatically derive, based on the identified properties for each of the plurality of users and by operation of one or more computer processors when executing the program, a respective recording criterion common across the respective plurality of events attended by the respective user, wherein the programmatically deriving includes deriving a first recording criterion specific to the first user and a second recording criterion specific to the second user, wherein the first and second recording criteria are distinct;
   upon a first event occurring and satisfying the derived first recording criterion, generate a first recording comprising captured video footage of at least part of the first event;
   upon a second event occurring subsequent to the first event and satisfying the derived second recording criterion, generate a second recording comprising captured event data of at least part of the second event, wherein the captured event data excludes video footage and comprises data sufficient to reconstruct at least part of the second event for playback; and
   outputting the captured video footage and the captured event data.

7. The computer program product of claim 6, wherein deriving the first recording criterion specific to the first user comprises:
   identifying a property, associated with each of the plurality of events, that occurs with a frequency which exceeds a predefined threshold.

8. The computer program product of claim 6, wherein the first and second recordings are generated automatically and without receiving any user request explicitly specifying to record any of the first and second events.

9. The computer program product of claim 6, wherein the first recording criterion specific to the first user and the second recording criterion specific to the second user are derived automatically and without receiving any user-specified recording criterion.

10. The computer program product of claim 6, wherein the events to record are identified based on recording criteria specific to the users and programmatically derived from occurred events in the virtual world.

11. A system to identify events to record for users interacting with one another via avatars in a virtual world, the system comprising:
   one or more computer processors; and
   a memory containing a program, which when executed by the one or more computer processors is configured to perform an operation comprising:
   identifying, for each of a plurality of users including a first user and a second user, properties of a respective plurality of events having occurred in the virtual world and having been attended by the respective user via a respective avatar;
   programmatically deriving, based on the identified properties for each of the plurality of users, a respective recording criterion common across the respective plurality of events attended by the respective user, wherein the programmatically deriving includes deriving a first recording criterion specific to the first user and a second recording criterion specific to the second user, wherein the first and second recording criteria are distinct;

upon a first event occurring and satisfying the derived first recording criterion, generating a first recording of the first event comprising captured video footage of at least part of the first event;

upon a second event occurring subsequent to the first event and satisfying the derived second recording criterion, generating a second recording comprising captured event data of at least part of the second event, wherein the captured event data excludes video footage and comprises data sufficient to reconstruct at least part of the second event for playback; and outputting the captured video footage and the captured event data.

12. The system of claim 11, wherein deriving the first recording criterion specific to the first user comprises:

identifying a property, associated with each of the plurality of events, that occurs with a frequency which exceeds a predefined threshold.

13. The system of claim 11, wherein the first and second recordings are generated automatically and without receiving any user request explicitly specifying to record any of the first and second events.

14. The system of claim 11, wherein the first recording criterion specific to the first user and the second recording criterion specific to the second user are derived automatically and without receiving any user-specified recording criterion.

15. The system of claim 11, wherein the events to record are identified based on recording criteria specific to the users and programmatically derived from occurred events in the virtual world.

16. The system of claim 11, wherein the events to record are identified based on recording criteria specific to the users and programmatically derived from occurred events in the virtual world, wherein the video footage is captured only upon determining that a first amount of available storage space is sufficient for storing video footage of the first event, wherein the video footage is captured without capturing any event data of the first event, wherein the captured video footage is playable by a media player application;

wherein the event data is captured only upon determining that a second amount of available storage space is insufficient for storing video footage of the second event, wherein the captured event data is playable by a virtual world application different from the media player application, to simulate the virtual world.

17. The system of claim 16, wherein the captured event data of the second event is not playable by the media player application, wherein the captured video footage of the first event is not playable by the virtual world application, wherein generating the second recording comprises generating the second recording by the virtual world application and without continuously recording all events occurring within the virtual world, the operation further comprising:

responsive to receiving, from the first user, a request to share the recorded first event with a second user, outputting the recorded first event for playback to the second user;

wherein at least one event not satisfying the first recording criterion specific to the first user is not recorded for the first user.

18. The system of claim 17, wherein the virtual world application is configured to independently generate the first recording based on each individual property selected from: (i) an event type of the first event; (ii) an event location of the first event; (iii) a count of participants in the first event; (iv) an event duration of the first event; (v) an event starting time of the first event; (vi) an event ending time of the first event; and (vii) a presence of one or more specified participants at the first event;

wherein a first occurred event is not recorded by the first user in the virtual world, wherein a second occurred event is not attended by the first user in the virtual world, wherein the first and second recordings are stored in a data store and are accessible for subsequent playback, wherein the first and second recordings are generated automatically and without receiving any user request explicitly specifying to record any of the first and second events.

19. The system of claim 18, wherein the first recording criterion specific to the first user and the second recording criterion specific to the second user are derived automatically and without receiving any user-specified recording criterion, wherein the plurality of events associated with the first user includes the first occurred event attended by the first user in the virtual world and a third occurred event explicitly specified by the first user to be recorded in the virtual world, wherein the subsequent playback occurs responsive to receiving a playback request from the first user;

wherein the virtual world application is further configured to, in deriving the first recording criterion specific to the first user, independently determine that the first event satisfies each predefined threshold selected from a first predefined threshold, a second predefined threshold, and a third predefined threshold, wherein the first predefined threshold comprises a total count of occurrences of events matching a first property.

20. The system of claim 19, wherein the second predefined threshold comprises a percentage of occurrences of events matching a second property, relative to a total count of occurrences of events, wherein the third predefined threshold comprises a standard deviation of occurrences of events matching a third property, relative to the total count of occurrences of events, wherein the first property, the second property, and the third property are distinct, wherein a third event occurring in the virtual world and not satisfying at least one of the first predefined threshold, the second predefined threshold, and the third predefined threshold is not recorded.

* * * * *